(12) United States Patent
Marques

(10) Patent No.: US 8,918,507 B2
(45) Date of Patent: Dec. 23, 2014

(54) DYNAMIC GROUPING OF ENTERPRISE ASSETS

(75) Inventor: Joseph Robert Marques, Kearny, NJ (US)

(73) Assignee: Red Hat, Inc., Raleigh, NC (US)

( * ) Notice: Subject to any disclaimer, the term of this patent is extended or adjusted under 35 U.S.C. 154(b) by 463 days.

(21) Appl. No.: 12/131,020

(22) Filed: May 30, 2008

(65) Prior Publication Data

US 2009/0300181 A1 Dec. 3, 2009

(51) Int. Cl.
*G06F 15/173* (2006.01)
*G06F 9/50* (2006.01)
*G06F 15/16* (2006.01)
*G06F 15/177* (2006.01)

(52) U.S. Cl.
CPC .................................. *G06F 9/5061* (2013.01)
USPC ............ 709/226; 709/203; 709/220; 709/223

(58) Field of Classification Search
CPC ............ G06F 9/5061; G06F 17/30067; H04L 69/329; H04L 29/06
USPC .................. 709/223, 226, 203, 220
See application file for complete search history.

(56) References Cited

U.S. PATENT DOCUMENTS

| | | | | |
|---|---|---|---|---|
| 5,826,239 | A * | 10/1998 | Du et al. ....................... | 705/7.26 |
| 6,768,901 | B1 * | 7/2004 | Osborn et al. ................ | 455/230 |
| 6,816,905 | B1 * | 11/2004 | Sheets et al. .................. | 709/226 |
| 7,050,807 | B1 * | 5/2006 | Osborn .......................... | 455/445 |
| 7,143,153 | B1 * | 11/2006 | Black et al. ................... | 709/223 |
| 7,461,148 | B1 * | 12/2008 | Beloussov et al. ............ | 709/226 |
| 7,577,723 | B2 * | 8/2009 | Matsuda et al. .............. | 709/220 |
| 2004/0039815 | A1 * | 2/2004 | Evans et al. ................... | 709/225 |
| 2006/0179143 | A1 * | 8/2006 | Walker et al. ................. | 709/226 |
| 2007/0183426 | A1 * | 8/2007 | Daude et al. .................. | 370/392 |
| 2008/0126406 | A1 * | 5/2008 | Endabetla et al. ......... | 707/103 R |
| 2009/0287825 | A1 * | 11/2009 | Walker et al. ................. | 709/226 |
| 2011/0252078 | A1 * | 10/2011 | Walker et al. ................. | 709/201 |

* cited by examiner

*Primary Examiner* — David Lazaro
*Assistant Examiner* — Vitali Korobov
(74) *Attorney, Agent, or Firm* — Lowenstein Sandler LLP

(57) ABSTRACT

Embodiments relate to systems and methods for dynamic grouping of enterprise assets. A management engine can receive a query to interrogate a set of enterprise resources, such as servers deployed on a network. A user can transmit a query to the management engine, including a specification of attributes by which to group targeted machines to include in the query. The query can include at least a simple group query and a pivoted group query. A simple group query can include an identifier as a simple group expression, and the target can include attributes to match with resources. A pivoted group query can include compound terms or attributes to be used to group resources in the query, such as resources having a parent/child relationship or other hierarchical relationship. The processes of construction of queries and aggregation of resources identified by those queries can all be integrated by the management engine.

15 Claims, 4 Drawing Sheets

DYNAMIC GROUPING OF ENTERPRISE ASSETS

FIELD

This invention relates generally to network systems, more particularly, to systems and methods for managing networked systems.

DESCRIPTION OF THE RELATED ART

Enterprise systems provide a technology platform to help organizations operate their business methods. Server resources are a valuable part of an enterprise system. The server resources typically include physical components, as well as operating systems, applications, and anything else run on the physical components to help the enterprise system function. The more extensive the enterprise system, the more server resources are required to execute and maintain the system. Clustering and grouping are methods used to run applications on several different server resources. This way, if any of the servers fail, the application is still accessible via the other server resources.

The more server resources there are in an enterprise system, the more time consuming it is to update and maintain all of the groups or clusters present across the resources. In addition, server resources are frequently upgraded to accommodate new technologies or replace old resources. Further, server resources in a testing environment are frequently changed and restarted. New groups and clusters among the server resources need to be created upon any change to the resources. Manually creating groups across the resources is very tedious and time consuming, especially if the enterprise system includes a large number of server resources.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of information and service portals, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments of the present disclosure are directed towards a system, a method, and an apparatus for monitoring and managing enterprise assets. The system, the method, and the apparatus allow for less burdensome and more efficient enterprise monitoring and management. The enterprise monitoring and management system allows a user to automatically aggregate, interrogate and manage system resources across the system's entire resource inventory. The aggregation can be based on logical associations of the resources in the inventory based on type, regardless of the whether the resource represents hardware, software, or services. The system allows a user to perform a search across the inventory to obtain group results with the queried parameters. The user can also perform compound searches, wherein multiple parameters are matched across the complete inventory.

Figure 1:
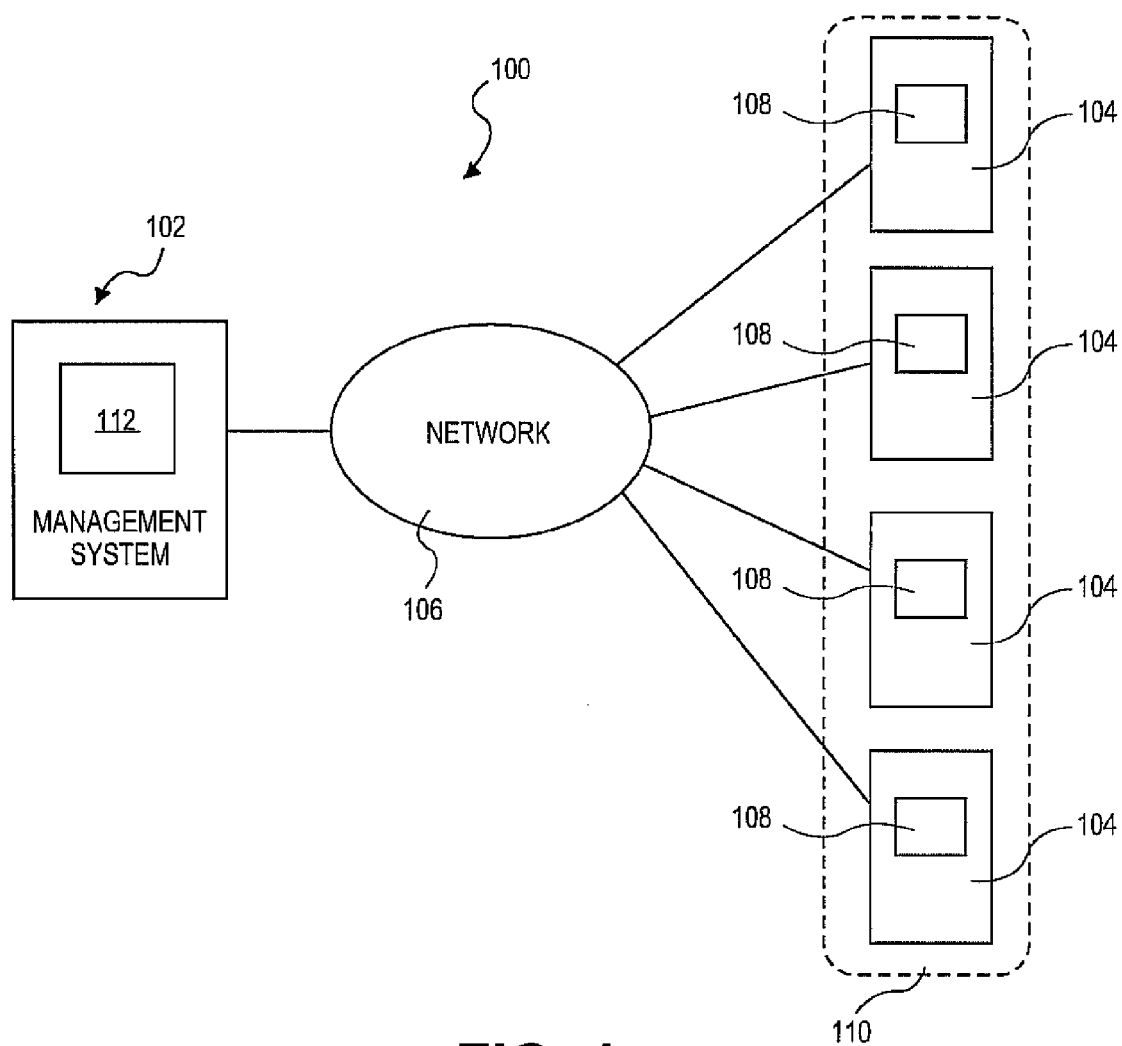
FIG. 1 illustrates an overall system architecture in which various embodiments of the present teachings can be practiced.

FIG. 1 illustrates an exemplary enterprise system 100 in accordance with embodiments. Enterprise system 100 is configured to combine computing resources to deliver services and functionality to and for an entity, such as a business, corporation, government entity, and the like. It should be readily apparent to those of ordinary skill in the art that system 100 depicted in FIG. 1 represents a generalized schematic illustration and that other components may be added or existing components may be removed or modified. Moreover, system 100 may be implemented using software components, hardware components, or combinations thereof.

As shown in FIG. 1, system 100 includes a management system 102, and enterprise platforms 104. The management system 102 and enterprise platforms 104 are coupled to a network 106. The network 106 can be a combination of wide area and local area networks such as the Internet, or other public or private networks. The network 106 can be configured to provide a communication channel between the management system 102 and enterprise platforms 104. The network 106 can implement a variety of network protocols to provide the communication channel such as Internet Protocol ("IP") v4/v6, ATM, SONET, or other similar network protocols.

The enterprise platforms 104 can be computing platforms configured to deliver or support the services and functionality of the enterprise system 100. The enterprise platforms 104 can include various types of computing platforms such as servers, personal computers, personal mobile devices, workstations, virtual machines, or other networked computing platforms. While FIG. 1 illustrates several enterprise platforms 104, the enterprise system 100 can include any number of enterprise platforms 108.

Each of the enterprise platforms 104 can implement one or more applications or processes 108 to provide, to integrate, and to support the services and functionality of the enterprise system 100. The applications or processes 108 can include electronic mail (E-mail) server and client applications, application servers, network hosting applications, content management applications, financial services applications, content delivery servers and applications, and the like.

In the enterprise system 100, the enterprise platforms 104, applications and processes 108, and the overall service provided by an enterprise platform 104 make up the resources of the enterprise system 100. The combination of all the resources makes up the inventory 110 of the resources for the enterprise system 100.

The management system 102 is configured to manage the inventory of resources 110 including the enterprise platforms 104, applications and processes 108, and overall services provided by an enterprise platform 104. To achieve this, the management system 102 can be configured to include a management tool 112. The management tool 112 is configured to deliver management process to the enterprise system 100. The management processes can include adding and removing the enterprise platforms 104, configuring the enterprise platforms 104, monitoring the enterprise platforms 104, upgrading and updating the enterprise platforms 104, adding and removing the applications and processes 108, configuring the applications and processes 108, monitoring the applications and processes 108, upgrading and updating the applications and processes 108, managing the overall services provided by an enterprise platform 104, and the like.

In embodiments, to deliver the management processes, the management tool 112 can be configured to dynamically group the resources in the inventory 110. A group of resources consists of an association of resources based on a common attribute or attributes of the resources. The attributes can include a unique identifier of the resource, a name of the resource, a version of the resource, an association of the resource (parent-resource, grand-parent-resource, child-resource), the type of the resource such as plugin, type name or category (platform, server, service, etc.), configuration of the resource, a location or domain of the resource, and traits of the resource such as measurements.

In embodiments, in order to dynamically group resource and deliver the management process, the management tool 112 can be configured to support simplified queries. The simplified queries are configured to be a compact, user friendly mechanism to request management process from the management tool 112. The simplified queries are constructed in a format familiar to users of the management tool 112 and straightforward to manipulate.

In embodiments, the simplified queries can include queries directed to the management process, along with an identification of the resource or group of resources associated with the management process. In particular, the simplified queries include two parts: one or more expressions defining the management process and a target of the expression. The expressions can define management processes such as dynamically grouping, starting, stopping, updating, measuring, and the like. The target can be a particular resource or group of resources and attributes of the resources.

In embodiments, for grouping queries, the management tool 112 can be configured to support at least two types of expressions: a simple group expression and a pivoted group expression. The simple group expression can be configured to produce one group associated with the target and populate that group with any resource that matches the target. The pivoted group expression can be configured to produce multiple groups associated with the target, and populate the groups based on a membership rule of the target.

In embodiments, for simple group queries, the simple group expression can include an identifier as a simple group expression, and the target can include one or more attributes to match with resources. For example, in a simple group query, a simple group expression can specify a simple query of resources and the attributes can include parent, type, and category, and the target can specify a platform as the attribute to match to resources. In such an example, the management tool 112 can be configured to search the entire inventory and find any resources that have a parent which is also a platform. As such, the management tool 112 can be configured to create one group including all the found resources.

In embodiments, for pivoted group queries, the pivoted group expression can include an identifier as a pivoted group expression and the target can include one or more attributes on which to perform the pivoted grouping. The attributes of the target define both the subject of the multiple groups and the membership of resources for the groups. For example, in a pivoted group query, a pivoted group expression can specify a pivoted query, and the target can specify resources, parent, and name. In such an example, the management tool 112 can be configured to search the entire inventory and find any resources that can be classified as a parent (i.e., any resource that has a child). As such, the management tool 112 can be configured to create a group for each resource that can be classified as a parent and populate the group with resources that are children of the parent.

For both the simple group expression and pivoted group expression, the management tool 112 can be configured to assign a unique identifier to each group. The unique identifier can be utilized in the simplified queries to specify a particular group. Additionally, the management tool 112 can be configured to maintain a repository of created groups associated with the unique identifiers. As such, when the management tool 112 receives a simplified query identifying a unique group identifier, the management tool 112 can be configured to retrieve all resources associated with the group.

In embodiments, the management tool 112 can be configured to process multiple group queries together. The management tool 112 can be configured to combine the multiple queries to perform an overall grouping process based on the combination of queries. The multiple group queries can be both simplified group queries and pivoted group queries.

In embodiments, the management tool 112 can be configured to receive request for a simplified query for a management process. The management tool 112 can be configured to parse the simplified query to extract the query expression and target. Once extracted, the management tool 112 can be configured to match the query expression with a management process and network query for performing the process. The management tool 112 can construct the network query with the extracted target and transmit the query to the resources in the inventory in order to perform the management process. The network query can be constructed in a network query language compatible with the resources receiving the network query regardless of the type or configuration of the resource.

Once the query is transmitted, the management tool 112 can be configured to receive a response from the inventory 110 and extract the results of the management process. The management tool 112 can be configured to process the results of the management process performed on the resources. In the case of group queries, the management tool 112 can be configured to populate the created groups with the results received from the inventory 110.

Figure 2:
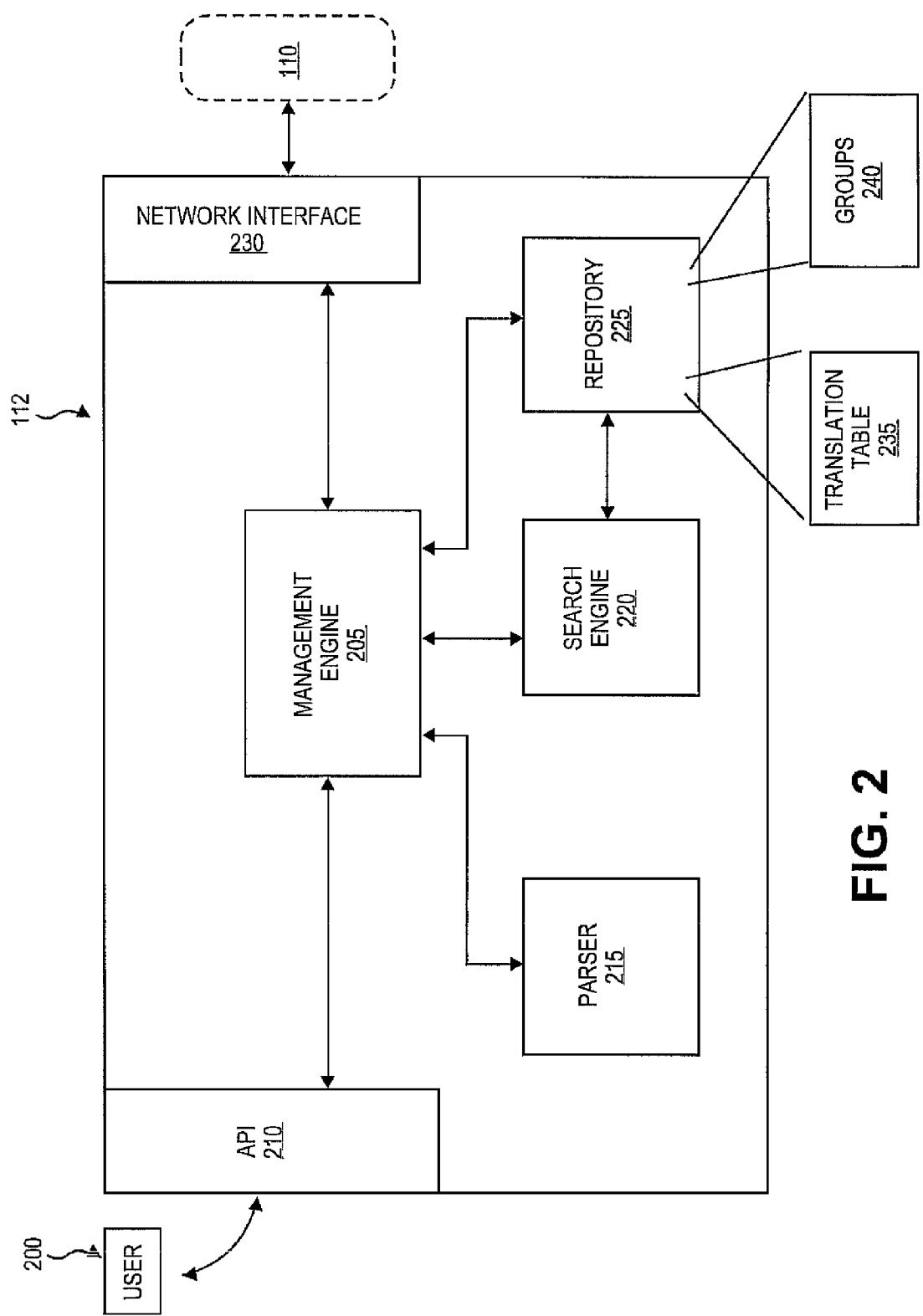
FIG. 2 illustrates an enterprise management tool, according to various embodiments.

FIG. 2 depicts a more detailed block diagram of the management tool 112 that can be utilized to provide management process for the enterprise environment 100, in accordance with embodiments. In embodiments, the management tool 112 can be configured to provide the management processes to a user 200. It should be readily apparent to those of ordinary skill in the art that the management tool 112 depicted in FIG. 2 represents a generalized schematic illustration and that other components may be added or existing components may be removed or modified.

As shown in FIG. 2, the management tool 112 can comprise a management engine 205, an application programming interface ("API") 210, a parser module 215, a search engine 220, a repository 225, and a network interface 230. It should be readily obvious to one of ordinary skill in the art that the modules 205-230 can be implemented as software applications (programmed in C, C++, JAVA, PHP, etc.), hardware components (EEPROM, application specific integrated circuit, microprocessor, etc.) or combinations thereof.

The management engine 205 can be configured to manage and interface with the other modules 210-230 to provide the functionality of the the management tool 112 as described above and further described herein below.

The management tool 112 is configured to deliver management process to the enterprise system 100. The management processes can include adding and removing the enterprise platforms 104, configuring the enterprise platforms 104, monitoring the enterprise platforms 104, upgrading and updating the enterprise platforms 104, adding and removing the applications and processes 108, configuring the applications and processes 108, monitoring the applications and processes 108, upgrading and updating the applications and processes 108, managing the overall services provided by an enterprise platform 104, and the like.

To initiate management, the management tool 112 can be configured to interact with a user 200. In particular, the management engine 205 can be configured to communicate with the user 200 via API 210. API 210 can be configured to generate GUIs, e.g. dialog boxes, web pages, as required by the management engine 205 and to provide an interface for requesting management process and receiving results from the management processes.

In embodiments, to deliver the management processes, the management tool 112 can be configured to dynamically group the resources in the inventory 110. The management tool 112 can be configured to dynamically group the resources in response to a request group the resources. In particular, the management engine 205 can be configured to receive simplified queries for grouping via API 210.

In embodiments, for grouping queries, the management tool 112 can be configured to support at least two types of expressions: a simple group expression and a pivoted group expression. In order to process the queries, the management engine 205 can be configure to pass the queries to parser 215. Parser 215 can be configured to extract the expression and the target from the query, and pass the extracted expression and target back to management engine 205.

For example, a simple group query can take the from of "<expression>=<target>," e.g. "resource.parent.type.category=Platform" In this example, the parser module 215 can be configure to identify and extract "resource.parent.type.category" as the the expression, and "Platform" as the target.

Once extracted, the management tool 112 can be configured to match the extracted expression with a management process. In particular, management engine 205 can be configured to maintain a repository 225. Repository 225 can be configured to store a translation table 235. Translation table 235 can include the various extracted expressions with the associated management process and network query to be utilized in communicating with the resources, according to the management process.

To retrieve the network query, the management engine 205 can be configured to pass the expression to search engine 220. Search engine 220 can be configured to search translation table 235 to match the expression to an associated management process and network query. Search engine 220 can be configured to return the results to management engine 205.

Once results are returned, the management engine 205 can be configured to combine the network query with the extracted target. Once combined, the management engine 205 can be configured to transmit the network query to the resources via network interface.

The management tool 112 can be configured to receive a response from the inventory 110 and extract the results of the management process. If available, the management engine 205 can be configured to receive the results from the repository 225 if the repository 225 contains the results. Otherwise, the management engine 205 can be configured receive the results via network interface 230. The management engine 205 can be configured to process the results of the management process. The processing can include providing the results to the user 200 via API 210.

In the case of group queries, the management engine 205 can be configured to create groups 240 for the results and to populate the created groups with the results received from the inventory 110. The management engine 205 can be configured to store the results in the repository 225.

For example, in a simple group query, a simple group query can take the from of "<expression>=<target>," e.g. "resource.parent.type.category=Platform". In such an example, the management engine 205 generates a network query to search the inventory 110 for resources for any resources with a parent which is a platform. When the results are received, the management engine 205 can be configured to create one group labeled platform and populate the group with all the found resources.

For pivoted group queries, the pivoted group query can take the form "groupby <expression>" e.g. "groupby <resource.parent.name>". In the query, the "groupby" indicates a pivoted expression and <resouce.parent.name>identifies the target. In such an example, the management engine 205 can be configured to generate a network query to search the entire inventory 110 and find all unique "resouce.parent.name" results. As such, the management engine 205 can be configured to create a group for each resource that can be classified as a parent and populate the group with resources that are children of the parent.

For groups, the management engine 205 can be configured to assign a unique identifier to each group. The unique identifier can be utilized in the simplified queries to specify a particular group. Additionally, the management engine 205 can be configured to maintain a repository of created groups associated with the unique identifiers. As such, when the management engine 205 receives a simplified query identifying a unique group identifier, the management engine 205 can be configured to retrieve all resources associated with the group by requesting search engine 220 retrieve the resources matching the unique identifier with groups stored in groups list 240.

In embodiments, the management engine 205 can be configured to process multiple queries including multiple group queries together. The management engine 205 can be configured to combine the multiple queries to perform an overall grouping process based on the combination of queries. The multiple group queries can be both simplified group queries and pivoted group queries. For the multiple group queries, the management engine 205 can be configured to process each query in order to provide a more narrowed grouping of the resources.

Figure 3:
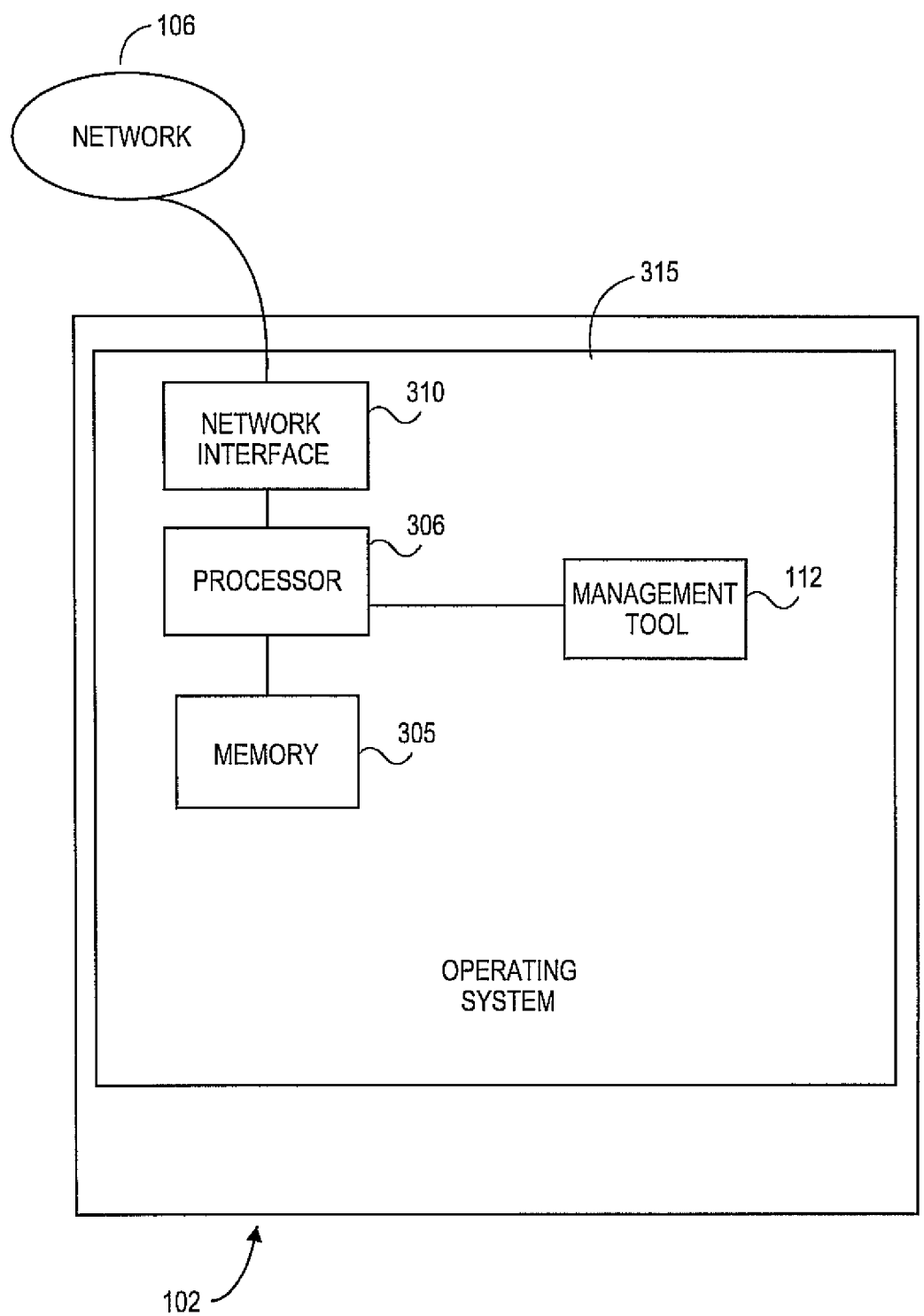
FIG. 3 illustrates a management system, according to various embodiments.

FIG. 3 illustrates an exemplary diagram of hardware and other resources that can be incorporated in the management system 102 configured to include or cooperate with the management tool 112, according to embodiments. In embodiments as shown, the management system 102 can comprise a processor 306 communicating with memory 305, such as electronic random access memory, operating under control of or in conjunction with operating system 315. Operating system 315 can be, for example, a distribution of the Linux™ operating system, the Unix™ operating system, or other open-source or proprietary operating system or platform. Processor 306 further communicates with network interface 310, such as an Ethernet or wireless data connection, which in turn communicates with one or more networks 106, such as the Internet or other public or private networks. Processor 306 also communicates with the management tool 112, to execute control logic and control the operation of the management tool 112 described above and below. Other configurations of the management system 102, associated network connections, and other hardware and software resources are possible.

Figure 4:
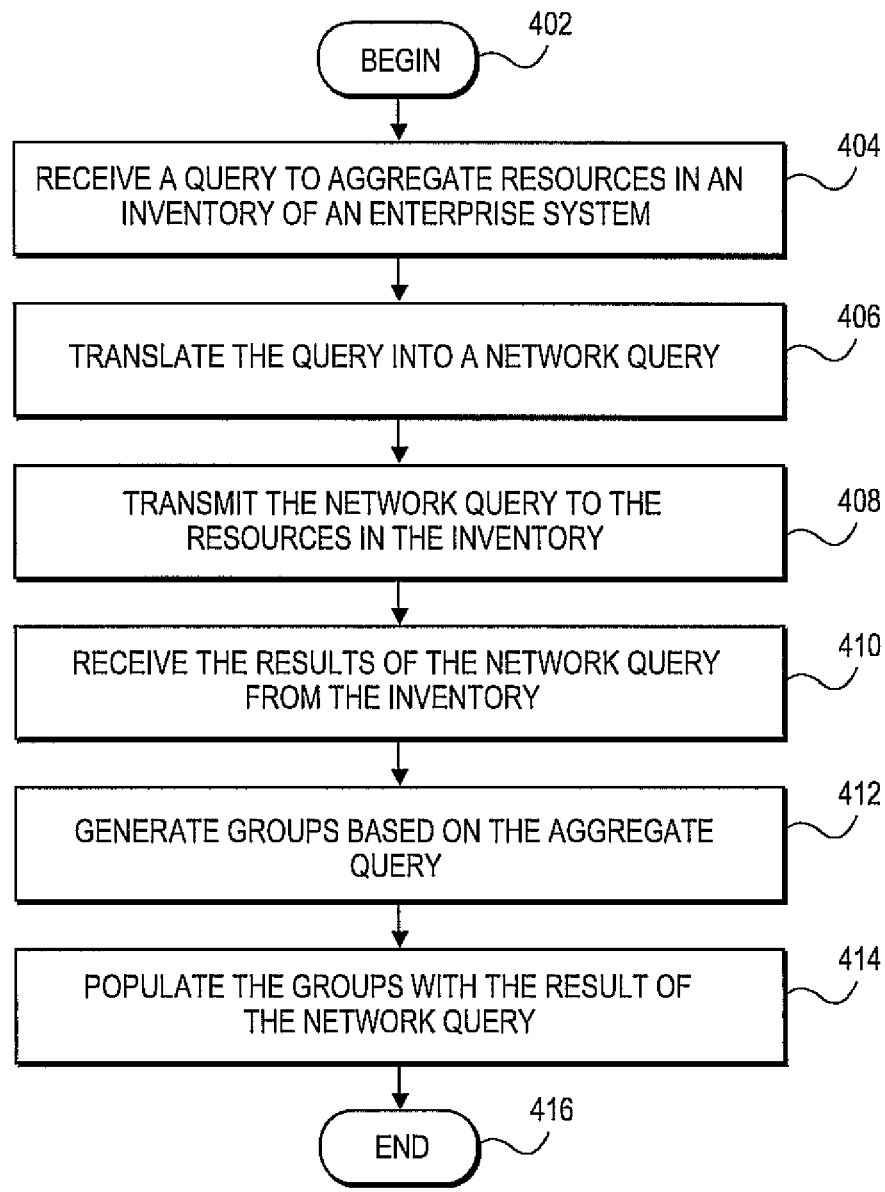
FIG. 4 illustrates an overall management process, according to various embodiments.

FIG. 4 illustrates a flow diagram of overall management processes, according to embodiments of the present teachings. In 402, processing can begin. In 404, the management tool 112 can receive a request to aggregate resources in an inventory of an enterprise system. In 406, the management tool 112 can translate the query into a network query.

After translation, in 408, the management tool 112 can transmit the network query to the resources in the inventory. In 410, the management tool 112 can receive the results of the network query from the inventory.

Once received, in 412, the management tool 112 can generate groups based on the aggregate query. Then, in 414, the management tool 112 can populate the groups with the results of the network query. In 416, the process can end, or return to any point and repeat.

In the foregoing and other embodiments, the user making request for management processes can be a person, customer, subscriber, corporation, organization, or other entity.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defied in the following claims and their equivalents.

What is claimed is:

1. A method comprising:
   receiving, by a processor, a request to identify resources of a system that comprise a specified set of attributes;
   generating by the processor, in view of the request, a query that specifies (i) a resource attribute, (ii) a management process comprising at least one of configuration, updating, or monitoring, and (iii) a target of the management process, wherein the resource attribute comprises a parent-child relationship between two resources;
   submitting the query to an inventory of resources of the system;
   receiving a response to the query that specifies a set of resources of the system that match the query, wherein the set of resources comprises a parent resource that is associated with a child resource;
   creating a group comprising the parent resource and the child resource; and
   performing, by the processor, the management process on the target using the set of resources.

2. The method of claim 1, further comprising:
   creating a group identifier that maps to the set of resources; and
   associating the group identifier with the group.

3. The method of claim 1, wherein the management process also comprises at least one of starting and stopping.

4. The method of claim 1, wherein the management process also comprises at least one of adding and removing.

5. The method of claim 2, further comprising:
   receiving multiple requests to identify resources from an inventory of resources, in view of the attributes of the resources; and
   combining the multiple requests to create the group identifier.

6. A system comprising:
   a network interface to couple to a network; and
   a processor to receive a request, via the network interface, to:
      identify resources of a system that comprise a specified set of attributes;
      generate, in view of the request, a query to specify (i) a resource attribute, (ii) a management process comprising at least one of configuration, updating, or monitoring, and (iii) a target of the management process, wherein the resource attribute comprises a parent-child relationship between two resources;
      submit the query, via the network interface, to an inventory of resources of the system;
      receive, via the network interface, a response to the query to specify that a set of resources of the system that match the query, wherein the set of resources comprises a parent resource that is associated with a child resource;
      create a group comprising the parent resource and the child resource; and
      perform the management process on the target using the set of resources.

7. The system of claim 6, wherein the processor is further to:
   create a group identifier that maps to the set of resources; and
   associate the group identifier with the group.

8. The system of claim 6, wherein the management process further comprises at least one of starting and stopping.

9. The system of claim 6, wherein the management process further comprises at least one of adding and removing.

10. The system of claim 7, wherein the processor is further to:
    receive multiple requests to identity resources from an inventory of resources, in view of the attributes of the resources; and
    combine the multiple requests to create the group identifier.

11. A non-transitory computer-readable storage medium comprising instructions that, when executed by a processor, cause the processor to perform operations comprising:
    receiving, by the processor, a request to identify resources of a system that comprise a specified set of attributes;
    generating by the processor, in view of the request, a query that specifies (i) a resource attribute, (ii) a management process comprising at least one of configuration, updating, or monitoring, and (iii) a target of the management process, wherein the resource attribute comprises a parent-child relationship between two resources;
    submitting the query to an inventory of resources of the system;
    receiving a response to the query that specifies a set of resources of the system that match the query, wherein the set of resources comprises a parent resource that is associated with a child resource
    creating a group comprising the parent resource and the child resource; and
    performing, by the processor, the management process on the target using the set of resources.

12. The non-transitory computer-readable storage medium of claim 11, wherein the operations further comprise:
   creating a group identifier that maps to the set of resources; and
   associating the group identifier with the group.

13. The non-transitory computer-readable storage medium of claim 11, wherein the management process also comprises at least one of starting and stopping.

14. The non-transitory computer-readable storage medium of claim 11, wherein the management process also comprises at least one of adding and removing.

15. The non-transitory computer-readable storage medium of claim 12, wherein the operations further comprise:
   receiving multiple requests to identify resources from an inventory of resources, in view of the attributes of the resources; and
   combining the multiple requests to create the group identifier.

* * * * *